(12) United States Patent
Boehmer et al.

(10) Patent No.: US 7,689,662 B2
(45) Date of Patent: Mar. 30, 2010

(54) METHOD AND ARRANGEMENT FOR CONTROLLING ACCESS TO DATA IN MOBILE COMMUNICATIONS NETWORKS

(75) Inventors: Bernhard Boehmer, Berlin (DE); Manfred Leitgeb, Gramatneusiedl (AT)

(73) Assignee: Siemens Aktiengesellschaft, Munich (DE)

( * ) Notice: Subject to any disclaimer, the term of this patent is extended or adjusted under 35 U.S.C. 154(b) by 874 days.

(21) Appl. No.: 10/162,224

(22) Filed: Jun. 5, 2002

(65) Prior Publication Data

US 2002/0199011 A1 Dec. 26, 2002

(30) Foreign Application Priority Data

Jun. 6, 2001 (DE) ................. 101 27 865

(51) Int. Cl.
*G06F 15/16* (2006.01)
*H04W 4/00* (2009.01)
*G06F 13/00* (2006.01)

(52) U.S. Cl. .............. 709/217; 455/433; 711/100

(58) Field of Classification Search ........... 709/225, 709/229–232, 223–224, 217–219; 707/9; 455/432–439; 711/100
See application file for complete search history.

(56) References Cited

U.S. PATENT DOCUMENTS

| | | | | |
|---|---|---|---|---|
| 5,684,859 A * | 11/1997 | Chanroo et al. | ............ | 455/433 |
| 5,708,780 A * | 1/1998 | Levergood et al. | ............ | 709/229 |
| 5,956,038 A * | 9/1999 | Rekimoto | ............ | 345/419 |
| 6,134,314 A * | 10/2000 | Dougherty et al. | ............ | 379/201.01 |
| 6,148,197 A * | 11/2000 | Bridges et al. | ............ | 455/432.3 |
| 6,195,432 B1 * | 2/2001 | Takahashi et al. | ............ | 380/277 |
| 6,233,452 B1 * | 5/2001 | Nishino | ............ | 455/435.2 |
| 6,357,010 B1 * | 3/2002 | Viets et al. | ............ | 726/4 |
| 6,442,391 B1 * | 8/2002 | Johansson et al. | ............ | 455/456.2 |
| 6,571,095 B1 * | 5/2003 | Koodli | ............ | 455/435.1 |
| 6,622,016 B1 * | 9/2003 | Sladek et al. | ............ | 455/414.1 |
| 6,631,397 B1 * | 10/2003 | Satomi et al. | ............ | 709/203 |
| 6,633,758 B1 * | 10/2003 | Heinonen et al. | ............ | 455/418 |
| 6,640,097 B2 * | 10/2003 | Corrigan et al. | ............ | 455/414.1 |
| 6,651,105 B1 * | 11/2003 | Bhagwat et al. | ............ | 709/239 |
| 6,781,972 B1 * | 8/2004 | Anderlind et al. | ............ | 370/329 |
| 6,785,823 B1 * | 8/2004 | Abrol et al. | ............ | 726/7 |
| 6,799,037 B1 * | 9/2004 | Mielke et al. | ............ | 455/435.1 |
| 6,859,649 B1 * | 2/2005 | Denenberg et al. | ............ | 455/406 |
| 7,194,764 B2 * | 3/2007 | Martherus et al. | ............ | 726/8 |
| 2001/0052077 A1 * | 12/2001 | Fung et al. | ............ | 713/184 |
| 2002/0025806 A1 | 2/2002 | Gerber | | |

(Continued)

FOREIGN PATENT DOCUMENTS

WO WO-98/41038 A2 9/1998

(Continued)

*Primary Examiner*—William C Vaughn, Jr.
*Assistant Examiner*—Ranodhi N Serrao
(74) *Attorney, Agent, or Firm*—King & Spalding L.L.P.

(57) ABSTRACT

A method and an arrangement of access to data by users in mobile communications networks which can be controlled. Data which is stored in one or more data memories in the mobile communications network for a user of the mobile communications network is addressed by a data processing device, after which a central control device in the mobile communications network uses predetermined checking criteria to check whether the data processing device is authorized to access such data, and the central control device allows access if the check result is positive.

4 Claims, 1 Drawing Sheet

U.S. PATENT DOCUMENTS

2002/0154627 A1* 10/2002 Abrol et al. .................. 370/352
2002/0157090 A1* 10/2002 Anton, Jr. ................... 717/178
2002/0169988 A1* 11/2002 Vandergeest et al. ........ 713/201
2003/0023726 A1* 1/2003 Rice et al. ................... 709/225

FOREIGN PATENT DOCUMENTS

WO    WO 98/52379    * 11/1998
WO    WO-98/52379 A1    11/1998

* cited by examiner

METHOD AND ARRANGEMENT FOR CONTROLLING ACCESS TO DATA IN MOBILE COMMUNICATIONS NETWORKS

CLAIM FOR PRIORITY

This application claims priority to German Application No. 10127865.9 filed Jun. 6, 2001.

TECHNICAL FIELD OF THE INVENTION

The invention relates to a method for controlling access to data in mobile communications networks.

BACKGROUND OF THE INVENTION

Mobile telecommunications networks are known in which data is stored such that there is no access control when such data is accessed by network nodes in the mobile communications networks. This method has been sufficiently reliable until now since these networks were intrinsically closed and no external access to the data was thus possible. One example of such a network is a mobile communications network constructed on the basis of the GSM Standard (Global System for Mobile Communication), in which user-specific data is stored, for example, in a home location register (HLR). Other network elements used in these GSM networks can access the home location register without any access control.

In the course of the opening up of mobile communications networks, however, it is no longer possible to assume that a network will be intrinsically closed, since external devices (for example network nodes which provide services for an end user=application server) can also access such data. In mobile communications networks based on the UMTS Standard (UMTS=Universal Mobile Telecommunication Service), it is even possible for a number of network operators to use one network jointly.

A device for checking the authorization for use of protected services, in which algorithms and data which are required for checking authorization are stored in a computer, is known from German Patent Specification DE 195 24 822 C1.

A method for using a mobile telephone to check data stored in a computer is known from German Laid-Open Specification DE 199 41 922 A1, in which an interrogation data record is transmitted from the mobile telephone to an SMS computer, which checks the legitimacy and then calls up information from computers or databanks.

SUMMARY OF THE INVENTION

The invention discloses a method and an arrangement by which data can be accessed by users in mobile communications networks, virtually without any adverse effect despite the control.

In one embodiment of the invention, data which is stored in one or more data memories in the respective mobile communications network for a user of the mobile communications network is addressed when prompted by a data processing device, a read addressing message or a write addressing message is sent from the data processing device to the respective data memory in order to address the data, the respective data memory sends a checking request to a central control device, after which the central control device in the mobile communications network uses predetermined checking criteria to check whether the data processing device is authorized to access such data, and the central control device allows access if the check result is positive. In this case, it is preferable that the access to the data is controlled by a central control device in the mobile communications network, so that the individual data memories do not each have to have their own control device. In this embodiment, it is preferable that the data processing device communicates directly with the respective data memory. The respective data memory itself requests the central control device to check the authorization of the data processing device. A particularly advantageous feature in this case is that, when the data processing device has access authorization, data read from the data memory is transmitted directly from the data memory to the data processing device, and the central control device is not connected between the data memory and the data processing device, in terms of the signal flow, during this transmission process. A high data transmission speed can thus be achieved.

In another embodiment of the invention, if the check result is positive, the central control device allows access in that the central control device sends a positive check response message to the respective data memory, and the data memory then transmits the addressed data to the data processing device.

In still another embodiment of the invention, if the check result is positive, the central control device allows access in that the central control device sends a positive check response message to the respective data memory, and the data memory amends the addressed data by writing.

In yet another embodiment of the invention, there is an arrangement for controlling access to data in mobile communications networks, which has one or more data memories for storing data for users of the mobile communications networks, one or more data processing devices having access to such data, and a central control device, which is connected by the data memory to the data processing device, which, when data access has occurred, checks whether the respective data processing device is authorized to access the respective data.

BRIEF DESCRIPTION OF THE DRAWINGS

In order to explain the invention further.

DETAILED DESCRIPTION OF THE PREFERRED EMBODIMENTS

Figure 1:
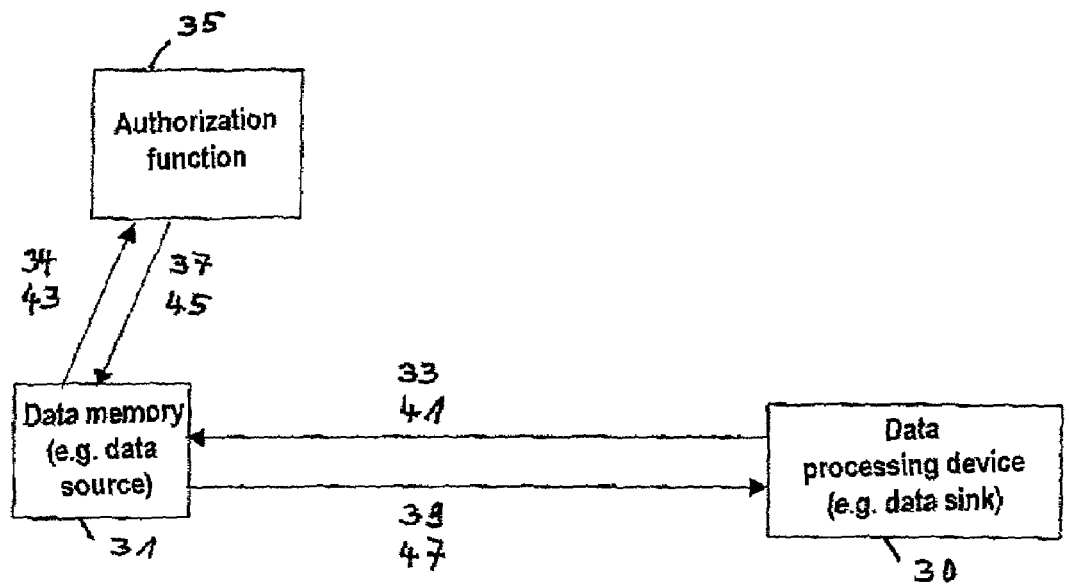
FIG. 1 shows a schematic illustration of one exemplary embodiment of an arrangement for carrying out the method for controlling access to data in mobile communications networks.

FIG. 1 shows a schematic illustration of three elements of communications networks, which may be located jointly in one mobile communications network, or else may be distributed between a number of different mobile communications networks. A data processing device 30 is shown on the right in FIG. 1. A device such as this may also be referred to as a data sink. For the purposes of the present application, a data processing device is intended to mean any device which requires data to carry out a function, with the data being stored in other network elements in the mobile communications network. A data processing device such as this may be, for example, a network node which is formed by a computer, with a program which provides a service for an end user running on the computer. A program such as this is referred to as an application, and a computer such as this is often referred to as an application server. Furthermore, FIG. 1 shows a data memory 31, which may also be referred to as a data source. A data memory is a device in a mobile communications network in which personal data is stored for a user of the mobile communications network. There may be a number of data memories in one mobile communications network. Data memories such as these may also be located in different mobile communications networks, with these different mobile communications networks being coupled to one another. In addition to the data processing device 30 and the data memory 31, the illustration shows a central control device 35 which may, for example, be in the form of a computer that is referred to as a proxy. The central control device carries out an authorization function, that is it controls access by the data processing device 30 to the data stored in the data memory.

FIG. 1 illustrates a method sequence schematically, in with the data processing device 30 reads data from the data memory 31. The data processing device 30 sends a read addressing message 33 to the data memory 31. The read addressing message 33 includes the information that the data processing device 30 wishes to read from the data memory 31 data for a user of the mobile communications network. It is possible to tell from the read addressing message 33 which data is intended to be read by which user. The read addressing message 33 may, for example, optionally also include information as to which service the data processing device 30 wishes to provide. That is, the service for which it requires the data for the user. The data processing device 30 sends the read addressing message 33 to the data memory 31 once it has been prompted to transmit. This may be the situation, for example, when the user wishes to use a service in his mobile communications network and declares this by operating the appropriate buttons on his mobile telephone. In response to such a prompt, the data processing device receives the information that data should be requested about the respective user. The data processing device may be the device providing the service. The data processing device 30 may, however, be requested to supply the data by another device providing a service.

The data memory 31 then sends a checking request 34 to a further central control device 35. Once the checking request 34 has reached the central control device 35, the latter uses the predetermined checking criteria to check whether the data processing device 30 is authorized to access the corresponding data. A wide range of (even complex) checking criteria may be used in this case. For the exemplary embodiment mentioned above (provision of a service for a service user by the data processing device 30, which is in the form of an application server), the following checking criteria may be mentioned by way of example:

which application (providing a service) is accessing the data?

is the application authorized to address that data (asking a question)?

is the application authorized to access a data item of the addressed type?

is the application authorized to access the addressed data item for that specific end user, i.e. is the end user a subscriber to the service which wishes to access that data item?

is the application authorized to read that data item?

is the application authorized to modify that data item?

at the time when that data item is addressed, is the end user blocked for the respective service since, for example, he has not paid his service charges?

is the end user aware that a data item which is being addressed is not intended to be available at the time when it is being addressed, because a) the data item is intended to be available only in specific time periods, b) the end user is using a terminal which is unsuitable for that service, or c) the data item is not intended to be available because the end user is at a predetermined location?

The central control device uses checking criteria such as these, or further checking criteria, to determine whether the data processing device is authorized to access the corresponding data. If the check results in a positive check result (i.e., the data processing device is authorized), then the central control device 35 allows access to the respective data item. This is done by the central control device 3 sending back a positive check response message 37 to the data memory 31 if the check result is positive. The data memory 31 then transmits the requested data by means of a message 39 to the data processing device 30. A successful read process from the data memory has thus taken place. The data processing device 30 has received a data item for the user of the mobile communications network and can use the data item to provide the service for the user.

If the data processing device 30 needs to modify a data item in the data source in order to carry out a service (i.e., the data item is changed by writing), then this is done by the data processing device 30 sending a write addressing message 41 to the data memory 31. The latter sends a check request 43 to the central control device 35. The central control device 35 checks whether the data processing device is authorized to carry out such a write access to the selected data item in the data memory for the user of the communications network. The checking criteria mentioned above, or similar checking criteria, may once again be used in this case. If the check result is positive (i.e., the data processing device is authorized to access the selected data item in order to write to it), the central control device 35 sends a further check response message 45 to the data source 31, which then carries out a writing change to the data in accordance with the information included in the write addressing message 41. After a successful writing process, the data memory 31 may optionally send a confirmation message 47 to the data processing device, in order to inform it that the writing process has been completed successfully. The data processing device 30 now has the information that the writing access to the user-specific data stored in the data memory 31 for the user of the mobile communications network has been carried out successfully, and that the data processing device 30 can continue to provide the service.

In the invention, it is advantageous that the check of the access authorization need not be carried out by the data source (data memory) but that the check is carried out by the central control device. This is particularly advantageous since existing mobile communications networks already contain large amounts of data with data modules, some of which are subject to strict specifications, and the addition of access authorization information to this data would be difficult and very complex. However, in fact, the invention has the advantage that the existing data are not modified, with the access control being carried out instead by the addition of access authorization information. The access authorization information (for example, the checking criteria mentioned above) are stored in the central control device 35 independently of the data source so that, for example, even editing the access control information does not have any effect on the data in the data memory 31. This allows even already existing networks (for example GSM mobile radio networks) in which data records already exist in data memories to be "upgraded" with the control method according to the invention. The method according to the invention may be referred to as "distributed access control to data" or "distributed access authorization for data", since the personal user data for the users of the mobile communications networks and the access control data and information need not necessarily exist in one computer but, in fact, may also be distributed between different computers and different network elements.

A further advantage of the method is that the data processing device 30 may be located within or else outside the mobile telecommunication network to which the data memory 31 belongs. Access control beyond network boundaries is thus possible.

The data processing device and the data processing function carried out by the data processing device can be represented by a data processing device in the form of a service device or service functions. Services such as these are frequently referred to as value added services. A user profile access manager may be used as the central control device. The data memory may be represented in distributed form. The data memory may have associated with it a user profile, various amounts of data and further amounts of data, which are located in a different network from that in which the user profile is located.

The user profile itself includes references to the actual data for the users, located in the data records and in the further data records. If the data processing device wishes to access such data, then it sends an appropriate message (in a similar way to the message flows described in FIG. 1) to the central control device which, after carrying out its control function, sends read or write messages to the data memory, in this case specifically to the user profile. Since the user profile includes references to the data, the read and write messages are passed to the respectively responsible data record, where a read access or a write access then takes place.

In this case, it is advantageous that a data processing device, which is located in the same domain as a specific data record, can access the specific data record using the central control device for another domain. The central control device can thus also be used by data processing devices and data memories in other domains and in other networks.

The process of carrying out an access check is also referred to as an authorization function. The various data records may also be located in different computers. The data record may, for example, include so-called value added service personal settings. This means configuration data and other data for an end user, relating to a specific service (value added service).

Figure 2:
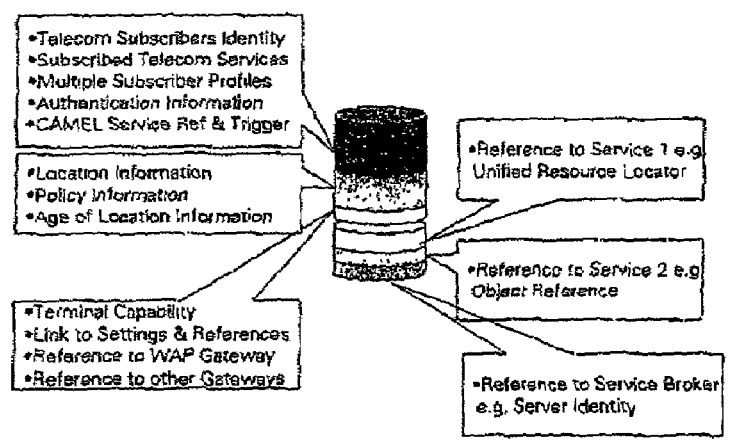
FIG. 2 shows an exemplary embodiment of a data gathering process, whose access is controlled.

FIG. 2 shows examples of data which can be stored in data memories of communications networks and for which an access check can be carried out using the methods and arrangements explained. The left half of the figure shows information which often occurs in conjunction with mobile communications networks based on the GSM Standard or the UMTS Standard. The right side shows examples of data containing service-specific information (value added service specific information).

An arrangement for carrying out an access check may also be used for a so-called instant messaging service. This service is preferably carried out by a computer (instant messaging server). An end user subscribes to this service using his mobile telephone. In the course of the service, messages may be sent to different mobile telephones of other end users. In order to provide this service, the computer may also make use of the location of the end user with his mobile telephone. This location is indicated by a code number, referred to as a cell ID, for a radio cell in the mobile communications network. The cell ID is stored, by way of example, in the home location register HLR in GSM networks. The already described method may now be used to allow effective access control for access by the computer to the data stored in the home location register HLR. The fundamental method of operation of the access control in this exemplary embodiment is similar to that explained in conjunction with FIG. 1. The access control in this example ensures that an instant messaging application (which runs on the computer) can access the cell ID of the mobile radio cell when the application is authorized to do so and this is confirmed in the check by the central control device. In this case, checking criteria may be used which take account of any wish by the end user, with his mobile telephone, to make his location accessible at specific times. The actual time at which the respective data is addressed is thus taken into account in the check.

An advantageous feature of this embodiment is that moving the access control to the central control device avoids any change to the home location register HLR for access control purposes. A further advantage is that access checks to widely distributed data can also be carried out relatively easily in this way. Such widely distributed data would exist, for example, if the home location register HLR were physically split between different computers.

With regard to the described invention, it should generally be noted that the devices in a mobile communications network which are able to permanently store user-specific data may be used as data memories. In addition to the already mentioned home location register HLR, a WAP gateway, a service control point SCP or a so-called presence server should also be mentioned as examples.

The central control device may, for example, be in the form of a computer in the mobile communications network. However, it is likewise also possible for the central control device to be distributed between a number of computers. The expression "central device" is merely intended to indicate that the function which the central control device carries out is carried out once in the network (logical centralization).

Data relating to users of the mobile communications network for which an access check is carried out may, for example, be:
  the location of the user with his mobile telephone
  the address
  the name
  the account number
  the prepaid account number
  the subscribed services
  the terminal characteristics (e.g. mobile telephone characteristics)
  the availability
  the agreement of the end user.

What is claimed is:

1. A method for controlling access to data in mobile communications networks, comprising:
  identifying particular data to be read from or written to a data memory by a data processing device in order for a particular service to be provided to a user of a mobile communication device;
  sending at least one of a read addressing message or a write addressing message from the data processing device to the data memory, the read addressing message or write addressing message identifying (a) the particular data to be read from or written to the data memory and (b) the user to be provided the particular service requiring the particular data to be read from or written to the data memory;
  in response to receiving the read addressing message or write addressing message at the data at the data memory, sending a checking request from the data memory to a central control device;
  checking by the central control device, using predetermined checking criteria, whether the data processing device is authorized to access the data memory to read or write the particular data identified in the read addressing message or write addressing message; and the central control device allowing the data processing device access to the data memory to read or write the particular data if the check result is positive and not if negative.

2. The method as claimed in claim 1, wherein if the check result is positive, the central control device allows access by sending a positive check response message to the data memory, and the data memory transmits the particular data to the data processing device.

3. The method as claimed in claim 1, wherein if the check result is positive, the central control device allows access by sending a positive check response message to the data memory, and the data memory then writes the particular data.

4. An arrangement for controlling access to data in mobile communications networks, comprising:

one or more data memories to store data for users of the mobile communications networks;

one or more data processing devices having access to the data, wherein a particular data processing device is designed to send at least one of a read addressing message or a write addressing message to a respective data memory, the read addressing message or write addressing message identifying (a) particular data to be read from or written to the data memory in order for a particular service to be provided to a user of a mobile communication device and (b) the user to be provided the particular service requiring the particular data to be read from or written to the data memory; and a central control device, which is connected by the data memory to the data processing device, to check whether the data processing device is authorized to access the particular data when data access occurs, wherein the central control device is designed to:

receive a checking request from the data memory;

check, using predetermined checking criteria, whether the data processing device is authorized to access the data memory to read or write the particular data identified in the read addressing message or write addressing message; and allow the data processing device access to the data memory to read or write the particular data if the check result is positive and not if negative.

\* \* \* \* \*